(12) United States Patent
Milner et al.

(10) Patent No.: US 7,445,004 B1
(45) Date of Patent: Nov. 4, 2008

(54) CAMPFIRE GRILL ASSEMBLY

(76) Inventors: Jack E. Milner, 3849 Bisbee St., Klamath Falls, OR (US) 97603; Julie A. Milner, 3849 Bisbee St., Klamath Falls, OR (US) 97603

( * ) Notice: Subject to any disclaimer, the term of this patent is extended or adjusted under 35 U.S.C. 154(b) by 311 days.

(21) Appl. No.: 11/234,801

(22) Filed: Sep. 26, 2005

(51) Int. Cl.
  *F24B 3/00* (2006.01)
(52) U.S. Cl. .......................... 126/9 R; 126/29; 126/30; 126/25 R; 126/215; 126/41 R
(58) Field of Classification Search .................. 126/29, 126/30, 9 R, 25 R, 41 R, 215, 449, 450
See application file for complete search history.

(56) References Cited

U.S. PATENT DOCUMENTS

| 3,837,328 | A | | 9/1974 | Schaffer | |
|---|---|---|---|---|---|
| 4,109,567 | A | | 8/1978 | Gage et al. | |
| 4,393,857 | A | | 7/1983 | Sanford | |
| 4,488,535 | A | | 12/1984 | Johnson | |
| 5,452,706 | A | * | 9/1995 | Meza | 126/30 |
| D370,387 | S | | 6/1996 | Dorvall et al. | |
| 6,006,740 | A | * | 12/1999 | Ulrickson et al. | 126/29 |
| 6,131,560 | A | * | 10/2000 | Healy | 126/30 |
| 6,805,113 | B2 | * | 10/2004 | Stephen et al. | 126/25 R |
| 7,004,160 | B1 | * | 2/2006 | Bates | 126/30 |
| 2006/0180399 | A1 | * | 8/2006 | Stanislao | 187/201 |

* cited by examiner

*Primary Examiner*—Steven B. McAllister
*Assistant Examiner*—Nikhil Mashruwala

(57) ABSTRACT

A campfire grill assembly includes a frame that has an inner perimeter and an outer perimeter. The frame has a generally rectangular shape and includes a first side member, a second side member, a third side member and a fourth side member wherein the first and second side members are positioned opposite of each other. A metallic mesh panel is attached to and is coextensive with the inner perimeter so that the panel extends across an opening defined by the inner perimeter. A support apparatus is attachable to the frame and is configured to support the frame in a horizontal orientation. The support apparatus may be extended into a ground surface so that the frame extends over a campfire.

15 Claims, 6 Drawing Sheets

CAMPFIRE GRILL ASSEMBLY

BACKGROUND OF THE INVENTION

1. Field of the Invention

The present invention relates to grill devices and more particularly pertains to a new grill device for assisting a person in cooking over a campfire.

2. Description of the Prior Art

The use of grill devices is known in the prior art. U.S. Pat. No. 4,109,567 describes a grill having a plurality of adjustable legs mounted thereon which are configured for supporting the grill over a campfire. Another type of grill device is U.S. Pat. No. 5,452,706 having a grill and four legs that are attached to the grill and extend downwardly from the grill. The legs may be positioned on a ground surface adjacent to and surrounding a campfire so that the grill is supported over the campfire. Still yet another such device is found in U.S. Pat. No. 4,393,857 and includes a grill having removably legs attached thereto by pins that extend along a length of the grill.

While these devices fulfill their respective, particular objectives and requirements, the need remains for a device that allows a person to easily set up a cooking area over a campfire. Additionally, the device should be readily collapsible and include storage area for the legs of the device so that the device may be easily packed and transported.

SUMMARY OF THE INVENTION

The present invention meets the needs presented above by generally comprising a frame that has an inner perimeter and an outer perimeter. The frame has a generally rectangular shape and includes a first side member, a second side member, a third side member and a fourth side member wherein the first and second side members are positioned opposite of each other. A metallic mesh panel is attached to and is coextensive with the inner perimeter so that the panel extends across an opening defined by the inner perimeter. A support apparatus is attachable to the frame and is configured to support the frame in a horizontal orientation. The support apparatus may be extended into a ground surface so that the frame extends over a campfire.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
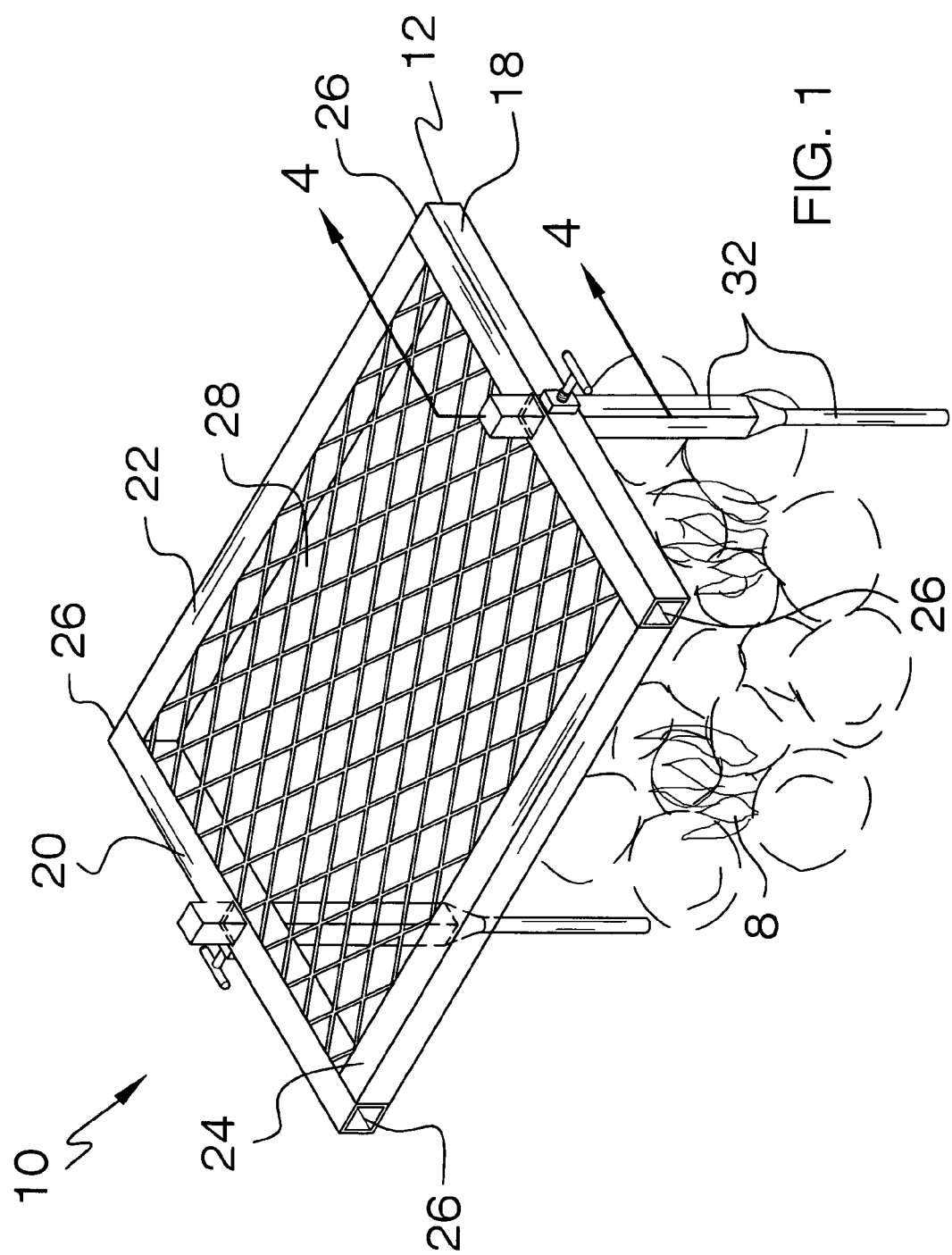
FIG. 1 is a perspective view of a campfire grill assembly according to the present invention.

With reference now to the drawings, and in particular to FIGS. 1 through 6 thereof, a new grill device embodying the principles and concepts of the present invention and generally designated by the reference numeral 10 will be described.

As best illustrated in FIGS. 1 through 6, the campfire grill assembly 10 generally comprises a frame 12 that has an inner perimeter 14 and an outer perimeter 16. The frame 12 has a generally rectangular shape and includes a first side member 18, a second side member 20, a third side member 22 and a fourth side member 24 wherein the first 18 and second 20 side members are positioned opposite of each other. Each of the first 18 and second 20 side members comprises a tubular member having a pair of open outer ends 26. The first 18 and second 20 side members each have a length between 8 inches and 24 inches and each of the third 22 and fourth 24 side members has a length generally between 18 inches and 30 inches. A metallic mesh panel 28 is attached to and is coextensive with the inner perimeter 14 so that the panel 28 extends across an opening defined by the inner perimeter 14.

Figure 6:
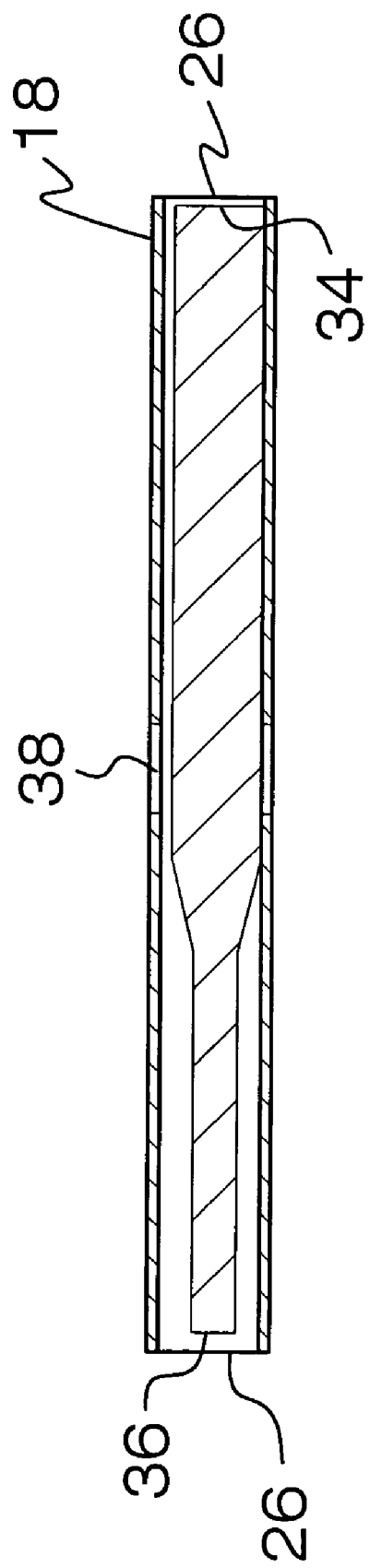
FIG. 6 is a cross-sectional view taken along line 6-6 of FIG. 2 of the present invention.

A support apparatus 30 is attachable to the frame 12 and is configured to support the frame 12 in a horizontal orientation. The support apparatus 30 includes a pair of legs 32 each having an upper end 34 and a lower end 36. The legs 32 taper inward to the lower ends 36 so that the lower ends 36 may easily be driven into a ground surface. Each of the legs 32 is extendable through one of two apertures 38 extending through the frame 12 to define a support position so that the lower ends 36 extend below a plane of the frame 12. Each of the apertures 38 is positioned in one of the first 18 and second 20 side members. The apertures 38 are orientated perpendicular to the plane of the frame 12 and are positioned generally equidistant from the third 22 and fourth 24 side members. Each of the legs 32 is removably extendable into one of the open outer ends 26 to define a stored position as shown in FIG. 6. The legs 32 each have a length less than a length of the first 18 and second 20 side members.

Figure 2:
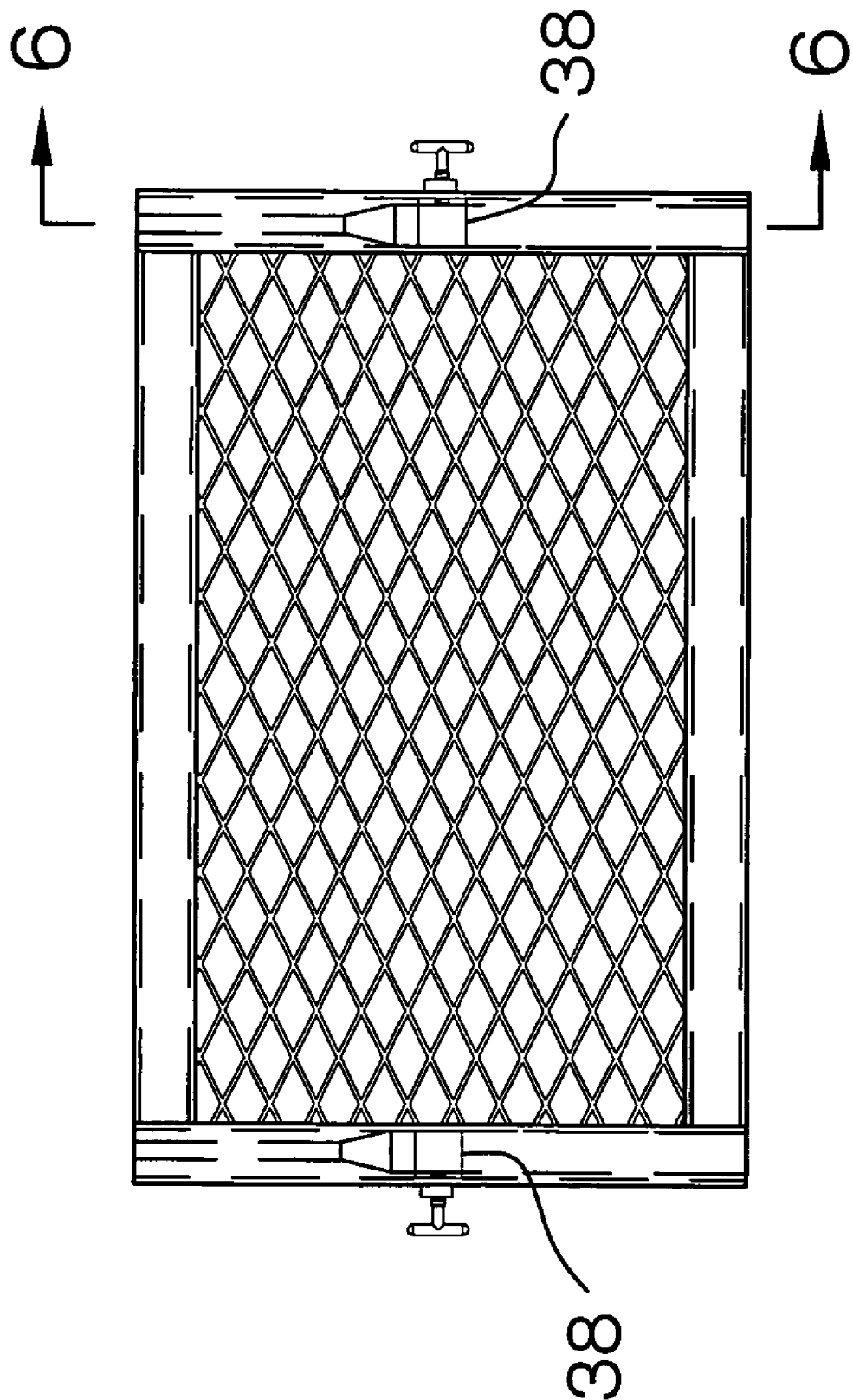
FIG. 2 is a top view of the present invention.
Figure 3:
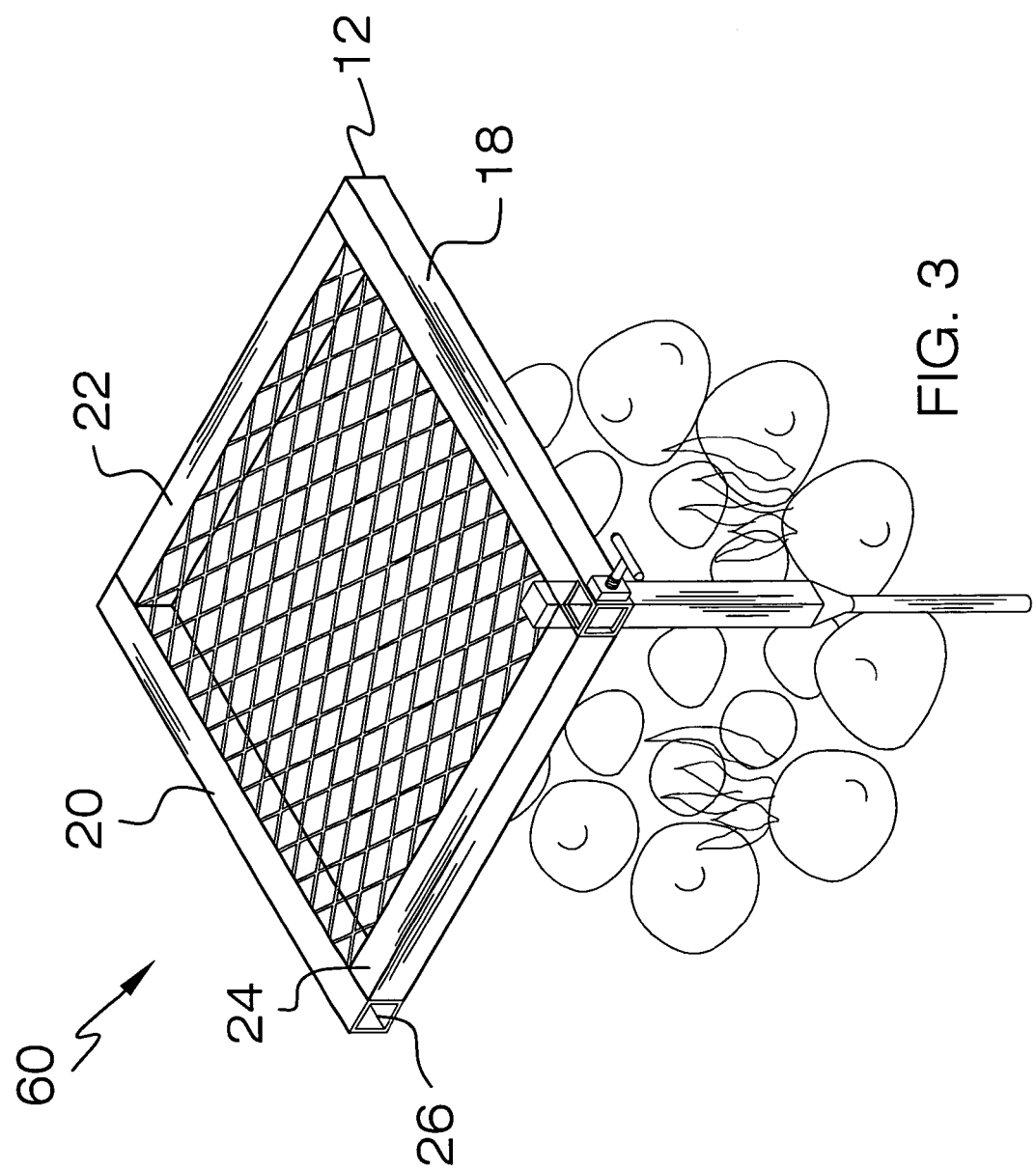
FIG. 3 is a perspective view of a second embodiment of the present invention.
Figure 4:
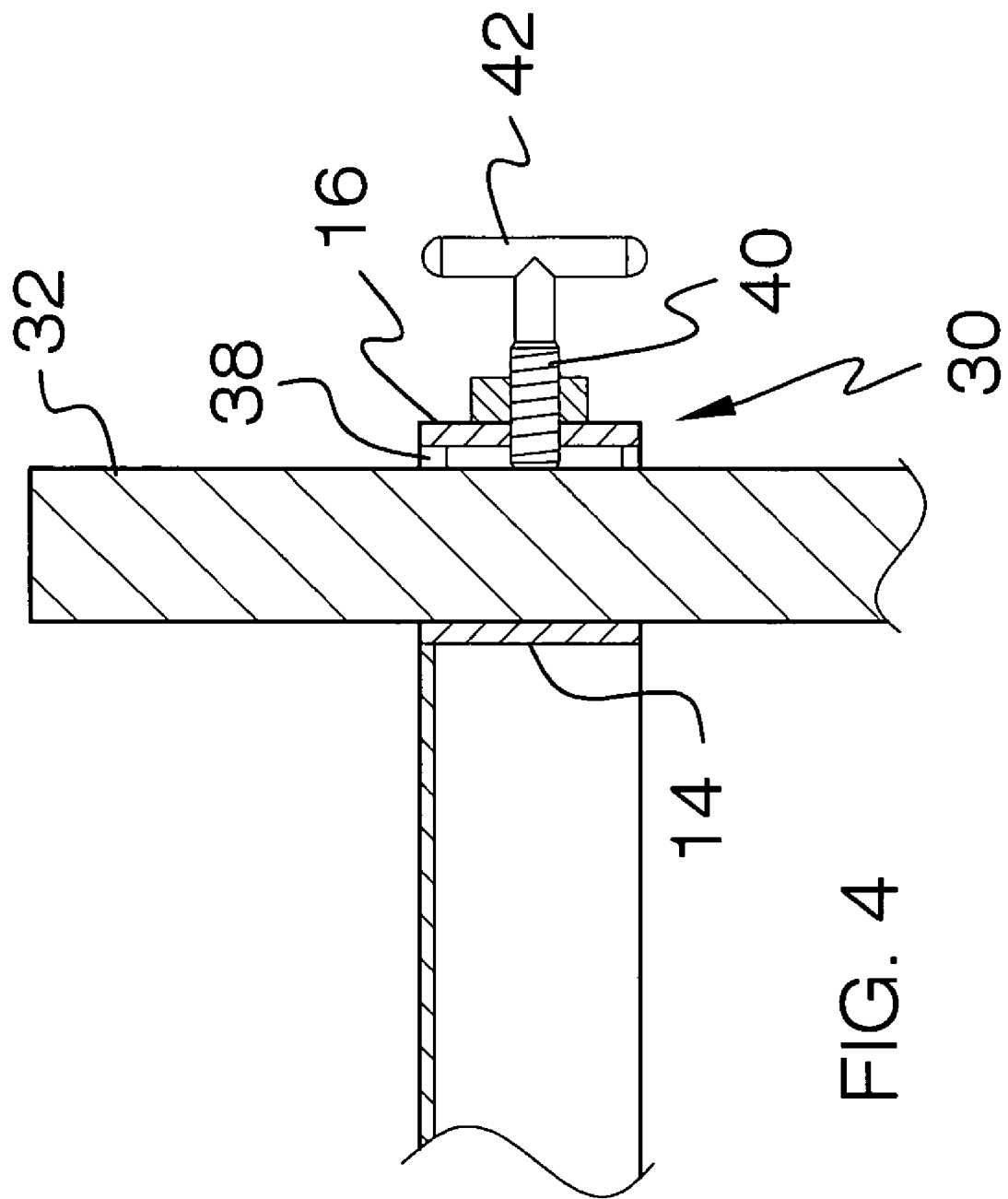
FIG. 4 is a cross-sectional view taken along line 4-4 of FIG. 1 of the present invention.
Figure 5:
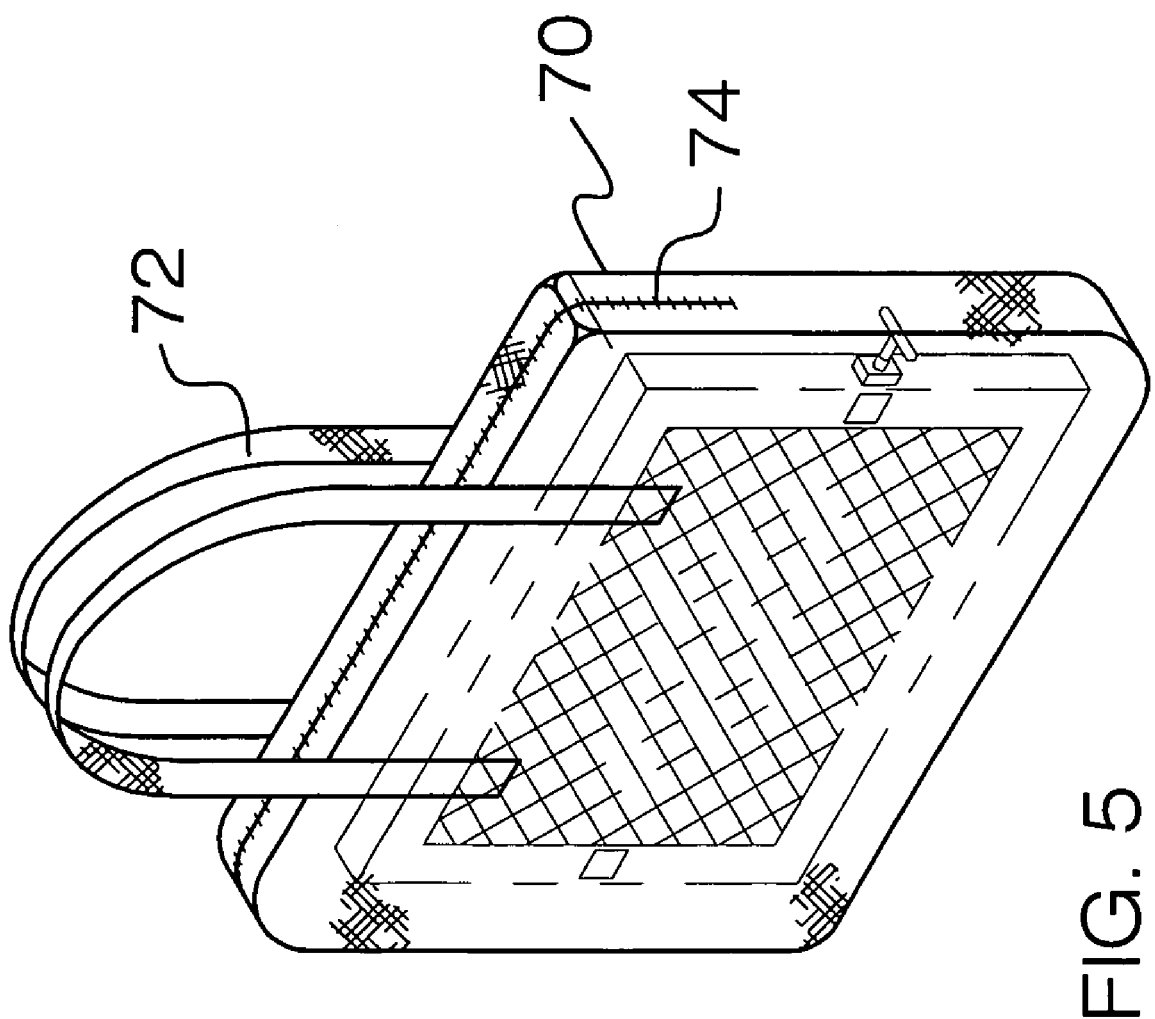
FIG. 5 is a perspective view of a traveling case of the present invention.

A pair of locking members 40 is attached to the frame 12. The locking members 40 are configured to selectively lock the legs 32 with respect to the frame 40. A height of the legs 32 from the lower ends 36 to the frame 12 may be selectively adjusted. Each of the locking members 40 comprises a threaded rod that is threadably coupled to the frame 12. Heads 42 attached to the rods, or locking members 40, assist a person in rotating the rods 40 into and out of the frame 12. Each of the threaded rods 40 extends laterally into one of the apertures 38 and frictionally sources the legs 32 to the frame 12. The locking members 40 are configured to releasably secure the legs 32 in the stored position as well by extending them into the first 18 and second 20 side members when the legs 32 are positioned in the first 18 and second 20 side members as shown in FIG. 2.

A second embodiment 60 is shown 3 and includes only one leg 32, aperture 38 and locking member 40. The second embodiment 60 would typically be used for frames 12 having a length and width each equal to or less than 12 inches. Further, the aperture 38 would be positioned adjacent to an end of the first side member 18.

In use, the support apparatus 30, or more particularly the lower ends 36 of the legs 32 of the support apparatus 30, is extended into a ground surface so that the frame 12 is horizontally supported and extends over a campfire 8. The user may adjust the height between the panel 28 and the campfire 8 by sliding the legs 32 through the apertures 38 and adjusting them with the locking members 40 as needed. Once the correct height has been achieved, the panel 28 may be used for cooking. The assembly 10 would preferably include a carrying case 70 having an interior length and width conforming to the length and width of the frame 12. The carrying case would include a zippered closure 74 and one or more attached handles 72 for assisting a person in carrying the assembly.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A campfire grill assembly comprising:
   a frame having an inner perimeter and an outer perimeter, said frame having a generally rectangular shape and including a first side member, a second side member, a third side member and a fourth side member wherein said first and second side members are positioned opposite of each other, each of said first and second side members comprising a tubular member having a pair of open outer ends;
   a metallic mesh panel being attached to and being coextensive with said inner perimeter such that said panel extends across an opening defined by said inner perimeter;
   a support apparatus being attachable to said frame and being configured to support said frame in a horizontal orientation, said support apparatus including a pair of legs each having an upper end and a lower end, each of said legs being extendable through one of two apertures extending through said frame to define a support position such that said lower ends extend below a plane of said frame, said apertures being positioned in said first and second side member, said apertures being orientated perpendicular to the plane of said frame, each of said legs being removably extendable into one of said open outer ends to define a stored position;
   wherein said support apparatus may be extended into a ground surface such that said frame extends over a campfire.

2. The assembly according to claim 1, further including a pair of locking members attached to said frame and configured to selectively lock said legs with respect to said frame, wherein a height of said legs from said lower ends to said frame may be selectively adjusted.

3. The assembly according to claim 2, wherein each of said legs has a length less than a length of said first and second side members.

4. The assembly according to claim 2, wherein each of said locking members comprises a threaded rod being threadably coupled to said frame, each of said threaded rods extending into one of said apertures and frictionally securing said legs to said frame.

5. The assembly according to claim 4, wherein said locking members are further configured to releasably secure said legs in said stored position.

6. The assembly according to claim 2, wherein said locking members are further configured to releasably secure said legs in said stored position.

7. The assembly according to claim 6, wherein said first and second side members each have a length between 8 inches and 24 inches, each of said third and fourth side members having a length generally between 18 inches and 30 inches.

8. The assembly according to claim 1, wherein said first and second side members each have a length between 8 inches and 24 inches, each of said third and fourth side members having a length generally between 18 inches and 30 inches.

9. The assembly according to claim 1, wherein said support apparatus includes a leg having an upper end and a lower end, said leg being extendable through an aperture extending through said frame to define a support position such that said lower end extends below a plane of said frame, said aperture being orientated perpendicular to the plane of said frame, said leg being removably extendable into one of said open outer ends to define a stored position, a locking member being attached to said frame and configured to selectively lock said leg with respect to said frame, wherein a height of said leg from said lower end to said frame may be selectively adjusted.

10. The assembly according to claim 9, wherein said leg has a length less than a length of said first and second side members.

11. The assembly according to claim 9, wherein said locking member comprises a threaded rod being threadably coupled to said frame, said threaded rod extending into said aperture and frictionally securing said leg to said frame.

12. The assembly according to claim 9, wherein said locking member is further configured to releasably secure said legs in said stored position.

13. The assembly according to claim 12, wherein said first and second side members each have a length between 8 inches and 24 inches, each of said third and fourth side members having a length generally between 18 inches and 30 inches.

14. The assembly according to claim 10, wherein said first and second side members each have a length between 8 inches and 24 inches, each of said third and fourth side members having a length generally between 18 inches and 30 inches.

15. A campfire grill assembly comprising:
    a frame having an inner perimeter and an outer perimeter, said frame having a generally rectangular shape and including a first side member, a second side member, a third side member and a fourth side member wherein said first and second side members are positioned opposite of each other, each of said first and second side members comprising a tubular member having a pair of open outer ends, said first and second side members each having a length between 8 inches and 24 inches, each of said third and fourth side members having a length generally between 18 inches and 30 inches;
    a metallic mesh panel being attached to and being coextensive with said inner perimeter such that said panel extends across an opening defined by said inner perimeter;

a support apparatus being attachable to said frame and being configured to support said frame in a horizontal orientation, said support apparatus including:
  a pair of legs each having an upper end and a lower end, each of said legs being extendable through one of two apertures extending through said first and second side members to define a support position such that said lower ends extend below a plane of said frame, said apertures being orientated perpendicular to the plane of said frame, each of said legs being removably extendable into one of said open outer ends to define a stored position, each of said legs having a length less than a length of said first and second side members;
a pair of locking members attached to said frame and configured to selectively lock said legs with respect to said frame, wherein a height of said legs from said lower ends to said frame may be selectively adjusted, each of said locking members comprising a threaded rod being threadably coupled to said frame, each of said threaded rods extending into one of said apertures and frictionally securing said legs to said frame, said locking members being configured to releasably secure said legs in said stored position; and
wherein said support apparatus may be extended into a ground surface such that said frame extends over a campfire.

* * * * *